US010012246B2

United States Patent
Bannon et al.

(10) Patent No.: US 10,012,246 B2
(45) Date of Patent: Jul. 3, 2018

(54) FAILSAFE DEPLOYMENT FEATURE FOR ACTUATOR

(71) Applicant: Hamilton Sundstrand Corporation, Charlotte, NC (US)

(72) Inventors: David G. Bannon, Rockford, IL (US); Timothy Scott Konicek, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 261 days.

(21) Appl. No.: 15/098,392

(22) Filed: Apr. 14, 2016

(65) Prior Publication Data

US 2017/0298964 A1 Oct. 19, 2017

(51) Int. Cl.
*F15B 15/26* (2006.01)
*F15B 15/14* (2006.01)
*B64D 41/00* (2006.01)

(52) U.S. Cl.
CPC .......... *F15B 15/261* (2013.01); *B64D 41/007* (2013.01); *F15B 15/1457* (2013.01)

(58) Field of Classification Search
CPC ... F15B 15/261; F15B 15/1457; B64D 41/007
See application file for complete search history.

(56) References Cited

U.S. PATENT DOCUMENTS

| 3,022,771 | A | 2/1962 | Chace |
| 7,216,581 | B2 | 5/2007 | McAuley |
| 8,640,563 | B2 * | 2/2014 | Lang .................... B64D 41/007 |
| | | | 74/89.37 |
| 2013/0327207 | A1 * | 12/2013 | Sasscer ................ B64D 41/007 |
| | | | 91/418 |

* cited by examiner

*Primary Examiner* — Thomas E Lazo
(74) *Attorney, Agent, or Firm* — Cantor Colburn LLP

(57) ABSTRACT

A linear actuator includes a fixed first end, a second end movable linearly along a central axis of the actuator, an inner cylinder configured to urge axial movement of the second end, and a piston assembly including a piston rod located inside of the inner cylinder. One or more locking pawls are located in pawl openings in the piston rod. The one or more locking pawls are selectably engagable with the inner cylinder to prevent relative motion of the piston rod and the inner cylinder. A lockbolt selectably releases the one or more locking pawls from engagement with the inner cylinder and includes an antilock pin engagable with a pawl opening in the one or more locking pawls to urge the one or more locking pawls away from the inner cylinder with axial movement of the lockbolt.

19 Claims, 4 Drawing Sheets

FAILSAFE DEPLOYMENT FEATURE FOR ACTUATOR

BACKGROUND

The subject matter disclosed herein relates to actuators for aircraft systems. More particularly, the present disclosure relates to deployment mechanisms for linear actuators.

Aircraft include many systems activated and/or controlled by actuators. One such system is a Ram Air Turbine (RAT). The ram air turbine is a turbine utilized to generate emergency power for the aircraft in the case of a loss of primary power. The ram air turbine is typically stowed inside the aircraft fuselage or wing, and is only deployed as needed. The ram air turbine is held in the stowed position by a locked linear actuator, and when the actuator is unlocked, the actuator extends to deploy the ram air turbine. During operation of an actuator 100 as shown in FIG. 4, if friction is too high, locking pawls 102 remain at piston rod 104 rather than moving radially inwardly to allow inner cylinder 106 axially past the locking pawls 102 into a deployed position. An apparatus to ensure deployment of the actuator would be well received in the art.

SUMMARY

In one embodiment, a linear actuator includes a fixed first end, a second end movable linearly along a central axis of the actuator, an inner cylinder configured to urge axial movement of the second end, and a piston assembly including a piston rod located inside of the inner cylinder. One or more locking pawls are located in pawl openings in the piston rod. The one or more locking pawls are selectably engagable with the inner cylinder to prevent relative motion of the piston rod and the inner cylinder. A lockbolt selectably releases the one or more locking pawls from engagement with the inner cylinder and includes an antilock pin engagable with a pawl opening in the one or more locking pawls to urge the one or more locking pawls away from the inner cylinder with axial movement of the lockbolt.

Additionally or alternatively, in this or other embodiments the antilock pin is configured to urge the one or more locking pawls radially inwardly toward the central axis.

Additionally or alternatively, in this or other embodiments the antilock pin is affixed to a lockbolt body and tapers from a pin base at the lockbolt body to a pin tip.

Additionally or alternatively, in this or other embodiments the linear actuator includes at least two antilock pins.

Additionally or alternatively, in this or other embodiments a rod end is located at the second end and is configured to operably connect the linear actuator to a component.

Additionally or alternatively, in this or other embodiments the lockbolt includes one or more rollers to selectably engage the one or more locking pawls to urge the one or more locking pawls into frictional contact with the inner cylinder.

In another embodiment, a method of operating a linear actuator includes urging a lockbolt of the linear actuator in a first axial direction along a central axis of the linear actuator and engaging one or more antilock pins of the lockbolt with one or more locking pawls. The one or more locking pawls extend through a piston assembly of the actuator into frictional contact with an inner cylinder of the actuator. The one or more locking pawls are moved out of frictional contact with the inner cylinder via the engagement of the one or more antilock pins with the one or more locking pawls and the inner cylinder is moved in a second axial direction, opposite the first axial direction.

Additionally or alternatively, in this or other embodiments engaging the one or more antilock pins with the one or more locking pawls includes striking a pin surface of the one or more antilock pins on a locking pawl opening edge surface and advancing the one or more antilock pins into the locking pawl opening.

Additionally or alternatively, in this or other embodiments the one or more locking pawls are urged radially inwardly toward the central axis via the engagement of the one or more antilock pins with the one or more locking pawls.

Additionally or alternatively, in this or other embodiments the urging the lockbolt of the linear actuator in a first axial direction along a central axis of the linear actuator includes urging one or more rollers out of contact with the one or more locking pawls. The one or more rollers are configured to urge the one or more locking pawls into frictional contact with the inner cylinder when the one or more rollers are in contact with the one or more locking pawls.

Additionally or alternatively, in this or other embodiments the antilock pin is affixed to a lockbolt body and tapers from a pin base at the lockbolt body to a pin tip.

Additionally or alternatively, in this or other embodiments the linear actuator includes at least two antilock pins.

Additionally or alternatively, in this or other embodiments a rod end is connected to the inner cylinder to operably connect the linear actuator to a component.

In yet another embodiment, a ram air turbine system includes a ram air turbine and a linear actuator operably connected to the ram air turbine to selectably move the ram air turbine from a stowed position to a deployed position. The linear actuator includes a fixed first end, a second end movable linearly along a central axis of the actuator, the second end operably connected to the ram air turbine, an inner cylinder configured to urge axial movement of the second end, and a piston assembly including a piston rod located inside of the inner cylinder. One or more locking pawls are positioned in pawl openings in the piston rod and are selectably engagable with the inner cylinder to prevent relative motion of the piston rod and the inner cylinder. A lockbolt selectably releases the one or more locking pawls from engagement with the inner cylinder and includes an antilock pin engagable with a pawl opening in the one or more locking pawls to urge the one or more locking pawls away from the inner cylinder with axial movement of the lockbolt.

Additionally or alternatively, in this or other embodiments the antilock pin is configured to urge the one or more locking pawls radially inwardly toward the central axis.

Additionally or alternatively, in this or other embodiments the antilock pin is affixed to a lockbolt body and tapers from a pin base at the lockbolt body to a pin tip.

Additionally or alternatively, in this or other embodiments the linear actuator includes at least two antilock pins.

Additionally or alternatively, in this or other embodiments a rod end is located at the second end configured to operably connect the linear actuator to the ram air turbine.

Additionally or alternatively, in this or other embodiments the lockbolt includes one or more rollers to selectably engage the one or more locking pawls to urge the one or more locking pawls into frictional contact with the inner cylinder.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
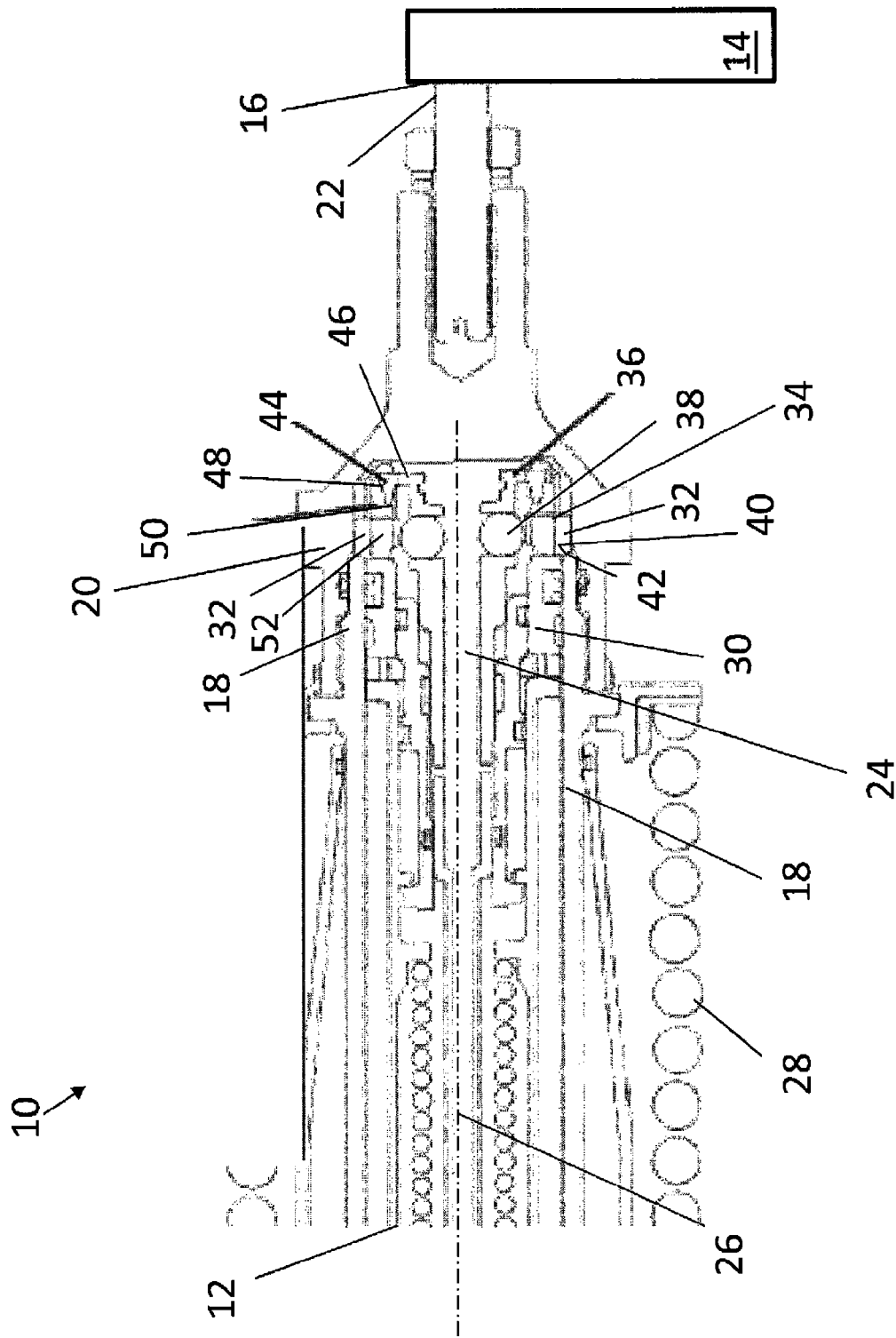
FIG. 1 is a schematic view of an embodiment of a linear actuator in a stowed position.

Referring now to FIG. 1, shown is a cross-sectional view of an embodiment of an actuator 10 in a stowed positon. The actuator 10 is anchored at a first end 12 and connected to a component 14, for example, a ram air turbine, at a second end 16 opposite the first end 12, and is arranged around a central axis 26. The actuator 10 includes an inner cylinder 18 and an outer cylinder 20 fixed to the inner cylinder 18, with the outer cylinder 20 connectible to the component 14 via, for example, a rod end 22.

A piston assembly 24 is positioned inside the inner cylinder 18 with piston assembly 24 anchored at the first end 12 and with the inner cylinder 18 biased toward an extended position by a biasing member, such as spring 28. The piston assembly 24 includes a piston rod 30 anchored at the first end 12, with one or more locking pawls 32 extending through pawl openings 34 in the piston rod 30. A lockbolt 36 extending axially along the actuator 10 is utilized to hold the locking pawls 32 in place in the pawl openings 34. In particular, rollers 38 of the lockbolt 36 urge locking pawls radially outwardly through pawl openings 34 into contact with inner cylinder 18, where a locking surface 40 of the locking pawls 32 frictionally engages a cylinder surface 42 of the inner cylinder 18 to lock the relative positons of the inner cylinder 18 and the piston rod 30.

Figure 2:
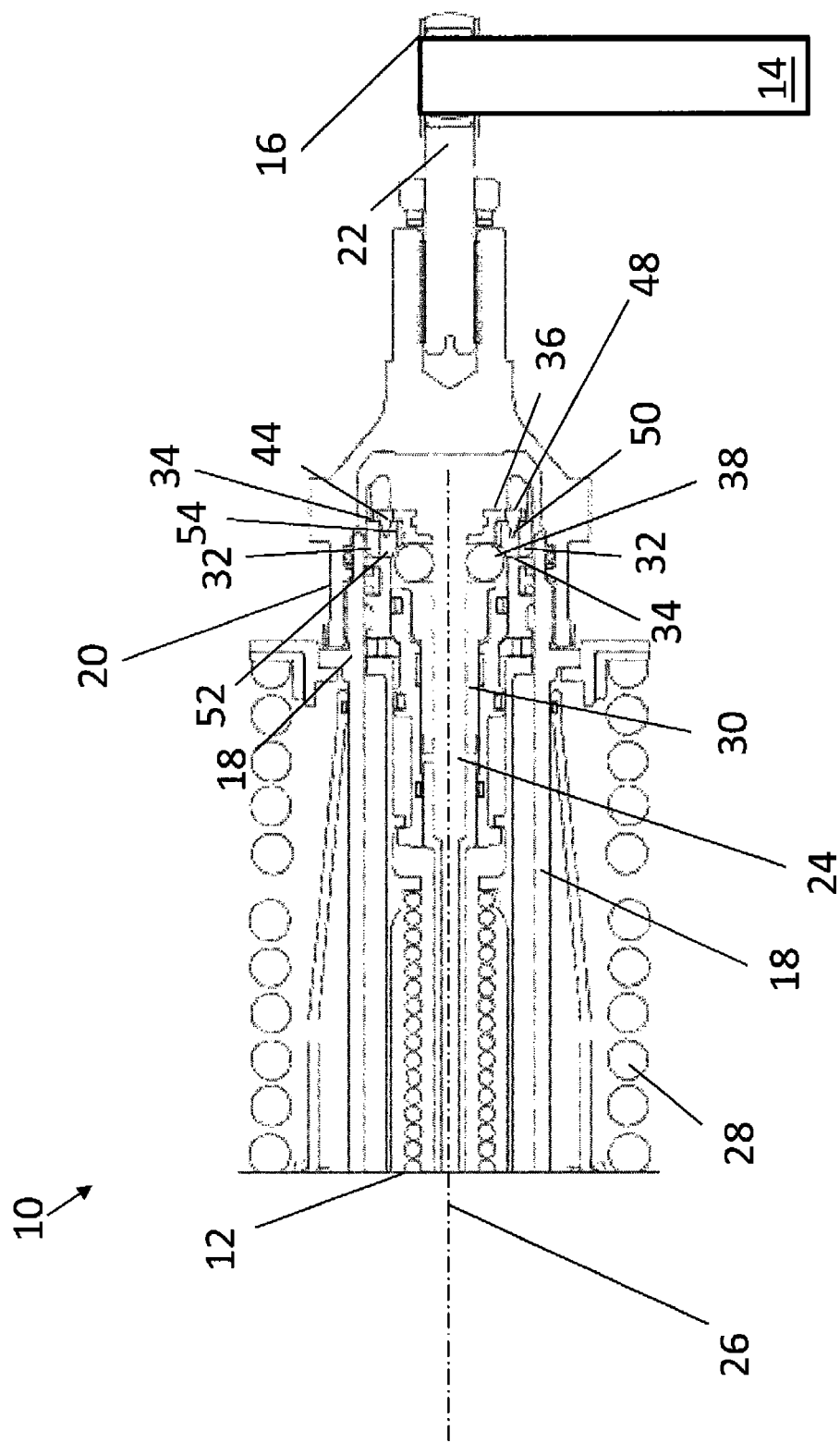
FIG. 2 is a schematic view of an embodiment of a linear actuator shown in a position right after the deploy command has been issued and when the pawls have moved inward which allows the actuator to start to extend.

Referring now to FIG. 2, to move the actuator 10 to a deployed position, the lock bolt 36 is moved axially toward the first end 12 such that the rollers 38 are moved out of contact with the locking pawls 32 and no longer support the locking pawls 32 in the radial direction. Inner cylinder 18 thus pushes the locking pawls 32 radially inwardly allowing the inner cylinder 18 to move axially away from the first end 12 urging the second end 16 away from the first end 12 to the deployed position.

Figure 3:
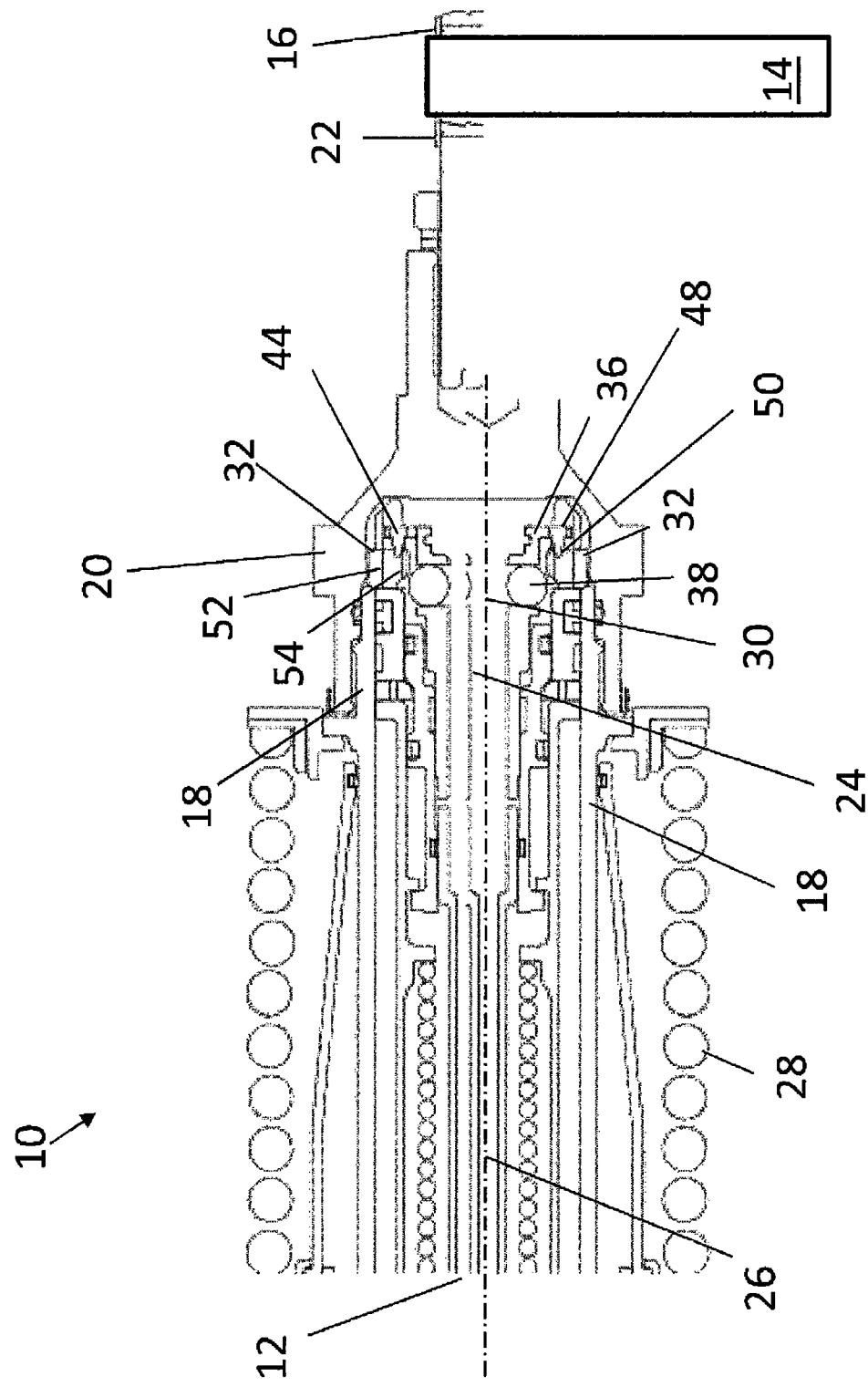
FIG. 3 is a schematic view of an embodiment of a linear actuator shown in a position right after the deploy command has been issued, the lockbolt has started to shift but the pawls have not yet moved.
Figure 4:
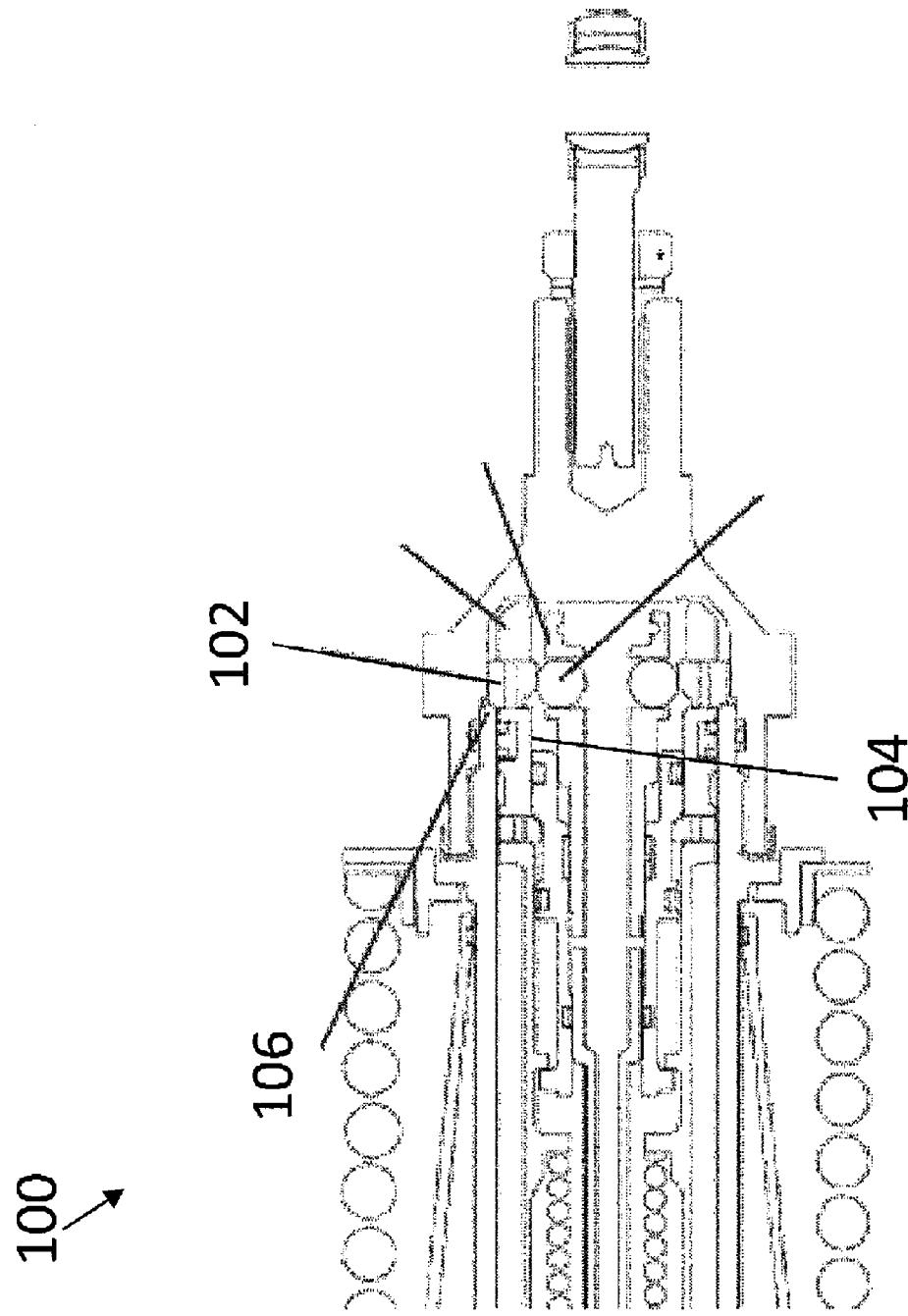
FIG. 4 is a schematic view of a prior linear actuator in the stowed and locked position.

Referring to FIG. 3, as discussed above, during some instances of actuation of the actuator from the stowed position to the deployed position, the locking pawls of prior actuators may initially fail to move radially inwardly, leading to failure of movement of the actuator to the deployed position and thus failure of the ram air turbine to fully deploy. To ensure movement of the actuator 10 to the deployed position and thus deployment of the ram air turbine, the lockbolt 36 includes one or more antilock pins 44 extending in an axial direction from a lockbolt body 36. In some embodiments, such as shown in FIG. 3, two antilock pins 44 are utilized, while other quantities of the antilock pins 44, such as one, three, four or more antilock pins 44 may be utilized in other embodiments.

The antilock pins 44 are tapered from a pin base 48 at the lockbolt body 36 to a pin tip 50 and are configured to engage a pawl opening 52 in the locking pawls 32. Referring again to FIG. 2, during a normal deployment of the actuator 10, the antilock pin 44 enters the pawl opening 52 without contacting a pawl opening edge 54.

Referring again to FIG. 3, the figure illustrates an abnormal deployment of the actuator 10, in which the benefits of the antilock pins 44 are shown. In FIG. 3, due to high frictional forces between the locking pawls 32 and the inner cylinder 18, the locking pawls 32 become "stuck" and fail to move radially inwardly when the rollers 38 are moved axially. As the lockbolt 36 and rollers 38 move axially toward the first end 12, however, antilock pin 44 will strike pawl opening edge 54. As the lockbolt 36 and the antilock pin 44 continue their axial movement toward the first end 12, the antilock pins 44 pull the locking pawls 32 radially inwardly, overcoming the frictional forces between the locking pawls and the inner cylinder 18. When the antilock pins 44 pull the locking pawls 32 radially inwardly, the inner cylinder 18 then moves axially away from the first end 12, and urges the second end 16 away from the first end 12 to the deployed position.

This solution prevents jamming or partial deployment of the actuator 10, while utilizing the normal motion of the lockbolt 36, together, with the antilock pins 44, to pull the locking pawls 32 radially inwardly in the event the locking pawls 32 become stuck due to frictional forces. Thus, partial or non-deployment of the actuator and thereby the ram air turbine is avoided.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A linear actuator comprising:
   a fixed first end;
   a second end movable linearly along a central axis of the actuator;
   an inner cylinder configured to urge axial movement of the second end; and
   a piston assembly including:
     a piston rod disposed inside of the inner cylinder;
     one or more locking pawls disposed in pawl openings in the piston rod, the one or more locking pawls selectably engagable with the inner cylinder to prevent relative motion of the piston rod and the inner cylinder;
     a lockbolt to selectably release the one or more locking pawls from engagement with the inner cylinder, the lock bolt including an antilock pin engagable with a pawl opening in the one or more locking pawls to urge the one or more locking pawls away from the inner cylinder with axial movement of the lockbolt.

2. The linear actuator of claim 1, wherein the antilock pin is configured to urge the one or more locking pawls radially inwardly toward the central axis.

3. The linear actuator of claim 1, wherein the antilock pin is affixed to a lockbolt body and tapers from a pin base at the lockbolt body to a pin tip.

4. The linear actuator of claim 1, wherein the linear actuator includes at least two antilock pins.

5. The linear actuator of claim 1, further comprising a rod end disposed at the second end configured to operably connect the linear actuator to a component.

6. The linear actuator of claim 1, wherein the lockbolt includes one or more rollers to selectably engage the one or more locking pawls to urge the one or more locking pawls into frictional contact with the inner cylinder.

7. A method of operating a linear actuator comprising:
   urging a lockbolt of the linear actuator in a first axial direction along a central axis of the linear actuator;
   engaging one or more antilock pins of the lockbolt with one or more locking pawls, the one or more locking pawls extending through a piston assembly of the actuator into frictional contact with an inner cylinder of the actuator;
   moving the one or more locking pawls out of frictional contact with the inner cylinder via the engagement of the one or more antilock pins with the one or more locking pawls;
   moving the inner cylinder in a second axial direction, opposite the first axial direction.

8. The method of claim 7, wherein engaging the one or more antilock pins with the one or more locking pawls includes:
   striking a pin surface of the one or more antilock pins on a locking pawl opening edge surface; and
   advancing the one or more antilock pins into the locking pawl opening.

9. The method of claim 7, further comprising urging the one or more locking pawls radially inwardly toward the central axis via the engagement of the one or more antilock pins with the one or more locking pawls.

10. The method of claim 7, wherein the urging the lockbolt of the linear actuator in a first axial direction along a central axis of the linear actuator includes urging one or more rollers out of contact with the one or more locking pawls, the one or more rollers configured to urge the one or more locking pawls into frictional contact with the inner cylinder when the one or more rollers are in contact with the one or more locking pawls.

11. The method of claim 7, wherein the antilock pin is affixed to a lockbolt body and tapers from a pin base at the lockbolt body to a pin tip.

12. The method of claim 7, wherein the linear actuator includes at least two antilock pins.

13. The method of claim 7, further comprising a rod end connected to the inner cylinder to operably connect the linear actuator to a component.

14. A ram air turbine system, comprising:
   a ram air turbine; and
   a linear actuator operably connected to the ram air turbine to selectably move the ram air turbine from a stowed position to a deployed position, the linear actuator including:
      a fixed first end;
      a second end movable linearly along a central axis of the actuator, the second end operably connected to the ram air turbine;
      an inner cylinder configured to urge axial movement of the second end; and
      a piston assembly including:
         a piston rod disposed inside of the inner cylinder;
            one or more locking pawls disposed in pawl openings in the piston rod, the one or more locking pawls selectably engagable with the inner cylinder to prevent relative motion of the piston rod and the inner cylinder;
         a lockbolt to selectably release the one or more locking pawls from engagement with the inner cylinder, the lock bolt including an antilock pin engagable with a pawl opening in the one or more locking pawls to urge the one or more locking pawls away from the inner cylinder with axial movement of the lockbolt.

15. The ram air turbine system of claim 14, wherein the antilock pin is configured to urge the one or more locking pawls radially inwardly toward the central axis.

16. The ram air turbine system of claim 14, wherein the antilock pin is affixed to a lockbolt body and tapers from a pin base at the lockbolt body to a pin tip.

17. The ram air turbine system of claim 14, wherein the linear actuator includes at least two antilock pins.

18. The ram air turbine system of claim 14, further comprising a rod end disposed at the second end configured to operably connect the linear actuator to the ram air turbine.

19. The ram air turbine system of claim 14, wherein the lockbolt includes one or more rollers to selectably engage the one or more locking pawls to urge the one or more locking pawls into frictional contact with the inner cylinder.

\* \* \* \* \*